United States Patent
Kim et al.

(10) Patent No.: US 11,551,682 B2
(45) Date of Patent: Jan. 10, 2023

(54) METHOD OF PERFORMING FUNCTION OF ELECTRONIC DEVICE AND ELECTRONIC DEVICE USING SAME

(71) Applicant: Samsung Electronics Co., Ltd., Suwon-si (KR)

(72) Inventors: Sunok Kim, Suwon-si (KR); Sungwoon Jang, Suwon-si (KR); Hyelim Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 16/714,386

(22) Filed: Dec. 13, 2019

(65) Prior Publication Data
US 2020/0193992 A1    Jun. 18, 2020

(30) Foreign Application Priority Data
Dec. 14, 2018    (KR) .......................... 10-2018-0162246

(51) Int. Cl.
*G10L 15/32*    (2013.01)
*G10L 15/22*    (2006.01)
(Continued)

(52) U.S. Cl.
CPC .............. *G10L 15/22* (2013.01); *G06F 3/167* (2013.01); *G10L 15/25* (2013.01); *G10L 25/84* (2013.01);
(Continued)

(58) Field of Classification Search
CPC ..... G10L 15/32; G10L 15/25; G06K 9/00335; H04N 5/23222
See application file for complete search history.

(56) References Cited

U.S. PATENT DOCUMENTS

| 5,586,215 A | * | 12/1996 | Stork | ...................... G10L 15/16 704/243 |
| 6,489,977 B2 | * | 12/2002 | Sone | ...................... G08B 5/226 715/810 |

(Continued)

FOREIGN PATENT DOCUMENTS

| CN | 104657650 A | 5/2015 |
| CN | 105825167 A | 8/2016 |

(Continued)

OTHER PUBLICATIONS

International Search Report dated Apr. 2, 2020 in connection with International Patent Application No. PCT/KR2019/017730, 3 pages.

(Continued)

*Primary Examiner* — Feng-Tzer Tzeng

(57) ABSTRACT

An electronic device includes: a camera; a microphone; a display; a memory; and a processor configured to receive an input for activating an intelligent agent service from a user while at least one application is executed, identify context information of the electronic device, control to acquire image information of the user through the camera, based on the identified context information, detect movement of a user's lips included in the acquired image information to recognize a speech of the user, and perform a function corresponding to the recognized speech.

16 Claims, 16 Drawing Sheets

(51) Int. Cl.
*G06F 3/16* (2006.01)
*G10L 15/25* (2013.01)
*G10L 25/84* (2013.01)
*H04N 5/232* (2006.01)

(52) U.S. Cl.
CPC ............. *H04N 5/232* (2013.01); *G10L 15/32* (2013.01); *G10L 2015/223* (2013.01)

(56) References Cited

U.S. PATENT DOCUMENTS

| | | | |
|---|---|---|---|
| 6,594,629 B1* | 7/2003 | Basu | G10L 25/78 |
| | | | 704/251 |
| 6,781,608 B1* | 8/2004 | Crawford | H04L 51/04 |
| | | | 715/753 |
| 9,997,159 B2 | 6/2018 | Takayanagi et al. | |
| 2003/0018475 A1 | 1/2003 | Basu et al. | |
| 2004/0267521 A1* | 12/2004 | Cutler | G10L 25/78 |
| | | | 704/E11.003 |
| 2006/0224382 A1* | 10/2006 | Taneda | G10L 21/0208 |
| | | | 704/233 |
| 2009/0018831 A1 | 1/2009 | Morita | |
| 2011/0071830 A1* | 3/2011 | Kim | G10L 15/25 |
| | | | 704/251 |
| 2011/0224978 A1 | 9/2011 | Sawada | |
| 2014/0010417 A1 | 1/2014 | Hwang | |
| 2014/0016835 A1 | 1/2014 | Song et al. | |
| 2014/0168074 A1 | 6/2014 | Lim et al. | |
| 2014/0191948 A1 | 7/2014 | Kim et al. | |
| 2014/0247325 A1* | 9/2014 | Wu | H04N 5/232933 |
| | | | 348/39 |
| 2015/0016733 A1 | 1/2015 | Park et al. | |
| 2015/0245133 A1 | 8/2015 | Kim et al. | |
| 2017/0098447 A1 | 4/2017 | Fu | |
| 2017/0309275 A1* | 10/2017 | Takayanagi | G10L 15/32 |
| 2018/0070008 A1 | 3/2018 | Tyagi et al. | |
| 2018/0268812 A1 | 9/2018 | Kim et al. | |
| 2020/0105262 A1 | 4/2020 | Abhinav et al. | |

FOREIGN PATENT DOCUMENTS

| | | |
|---|---|---|
| CN | 108875485 A | 11/2018 |
| EP | 2821938 A1 | 1/2015 |
| JP | 2011-164681 A | 8/2011 |
| JP | 4847022 B2 | 12/2011 |
| KR | 10-2009-0097292 A | 9/2009 |
| KR | 10-2011-0066628 A | 6/2011 |
| KR | 10-2014-0089183 A | 7/2014 |
| WO | 2013/009062 A2 | 1/2013 |
| WO | 2014/157756 A1 | 10/2014 |
| WO | 2018/169381 A1 | 9/2018 |

OTHER PUBLICATIONS

European Patent Office, "Supplementary Partial European Search Report", dated Nov. 17, 2021, in connection with counterpart European Patent Application EP 19894610.5, 5 pages.

Supplementary European Search Report dated Mar. 21, 2022, in connection with European Application No. 19894610.5, 18 pages.

* cited by examiner

METHOD OF PERFORMING FUNCTION OF ELECTRONIC DEVICE AND ELECTRONIC DEVICE USING SAME

CROSS-REFERENCE TO RELATED APPLICATION

This application is based on and claims priority under 35 U.S.C. 119 to Korean Patent Application No. 10-2018-0162246, filed on Dec. 14, 2018, in the Korean Intellectual Property Office, the disclosure of which is herein incorporated by reference in its entirety.

BACKGROUND

1. Field

The disclosure relates to a method of performing a function of an electronic device and an electronic device using the same.

2. Description of Related Art

Today, various types of electronic devices such as smart phones, tablet personal computers, or wearable devices are widely used. In order to increase the usability of such electronic devices, not only hardware components but also software components have been continuously improved. For example, the electronic device may provide an intelligent agent service for performing various functions in response to a user voice input.

The above information is presented as background information only to assist with an understanding of the disclosure. No determination has been made, and no assertion is made, as to whether any of the above might be applicable as prior art with regard to the disclosure.

SUMMARY

An intelligent agent service may recognize a voice, analyze the recognized voice, and provide a service, which a user desires to perform, to the user. The intelligent agent service operates on the basis of a user's voice and thus the voice recognition performance thereof may be influenced by noise (for example, surrounding noise) other than the user's voice. For example, recognizing a user's voice in the state in which surroundings of the electronic device is silent (for example, low noise) and recognizing a user's voice in the state in which surroundings of the electronic device is noisy (for example, high noise) may be significantly different.

In accordance with an aspect of the disclosure, an electronic device is provided. The electronic device includes: a camera; a microphone; a display; a memory; and a processor, wherein the processor is configured to receive an input for activating an intelligent agent service from a user while at least one application is executed, identify context information of the electronic device, control to acquire image information of the user through the camera, based on the identified context information, detect movement of a user's lips included in the acquired image information to recognize a speech of the user, and perform a function corresponding to the recognized speech.

In accordance with another aspect of the disclosure, a method by an electronic device is provided. The method includes: receiving an input for activating an intelligent agent service from a user while at least one application is executed; identifying context information of the electronic device; acquiring image information of the user through the camera, based on the identified context information; detecting movement of a user's lips included in the acquired image information to recognize a speech of the user; and performing a function corresponding to the recognized speech.

An electronic device according to various embodiments of the disclosure can use image information to improve the accuracy of an intelligent agent service. For example, the electronic device can analyze a function, which the user desires to perform, by applying a lip reading technology based on an acquired image. The electronic device can determine a function which the user desires on the basis of at least one of a user's voice and the shape of a user's lips and provide the determined function to the user. The user can detect a time point at which a user speech starts and a time point at which the user speech ends on the basis of the shape of the user's lips and correct the received unclear user voice through the lip shape, thereby provide a more accurate intelligent agent service to the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
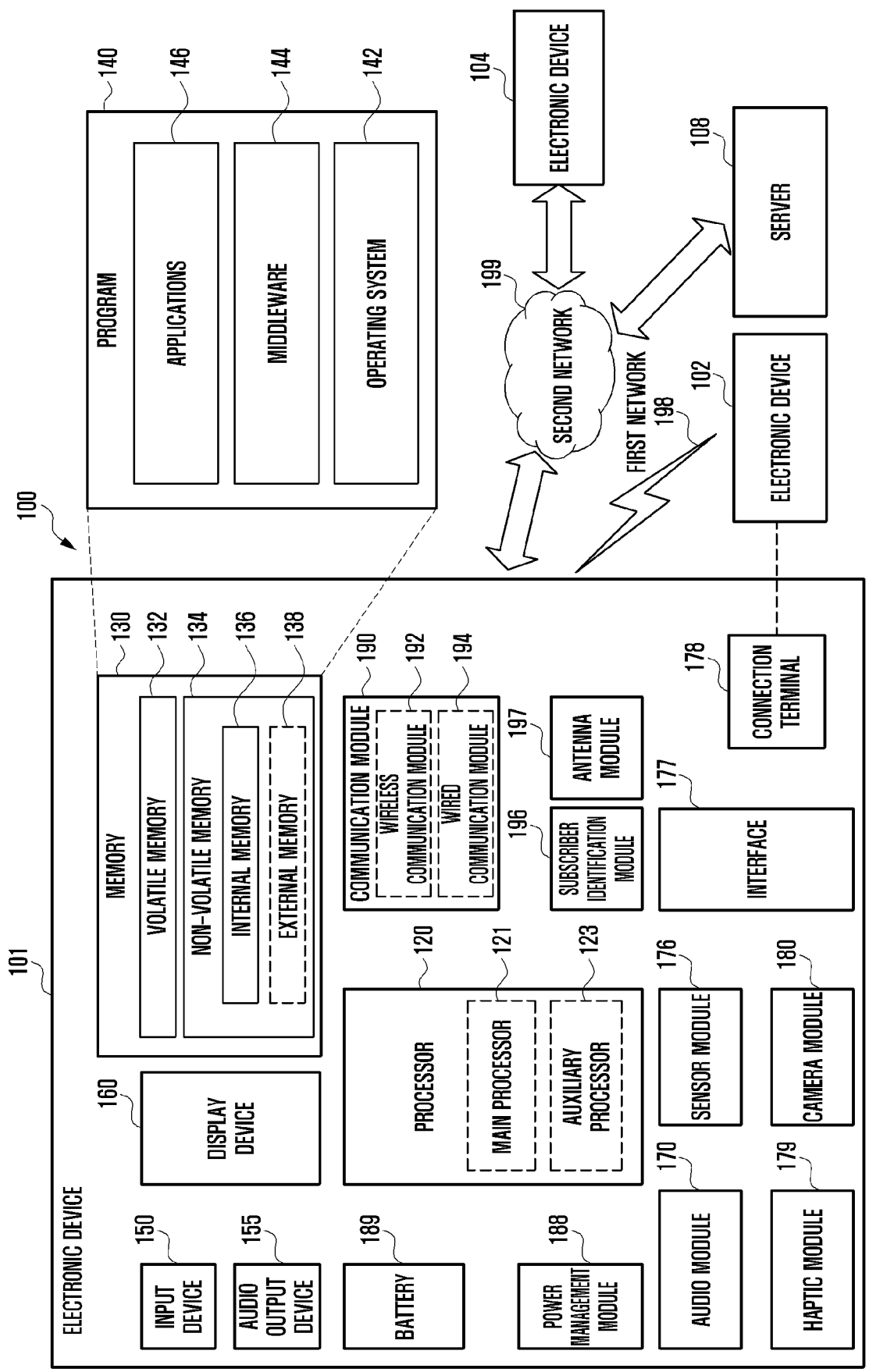
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
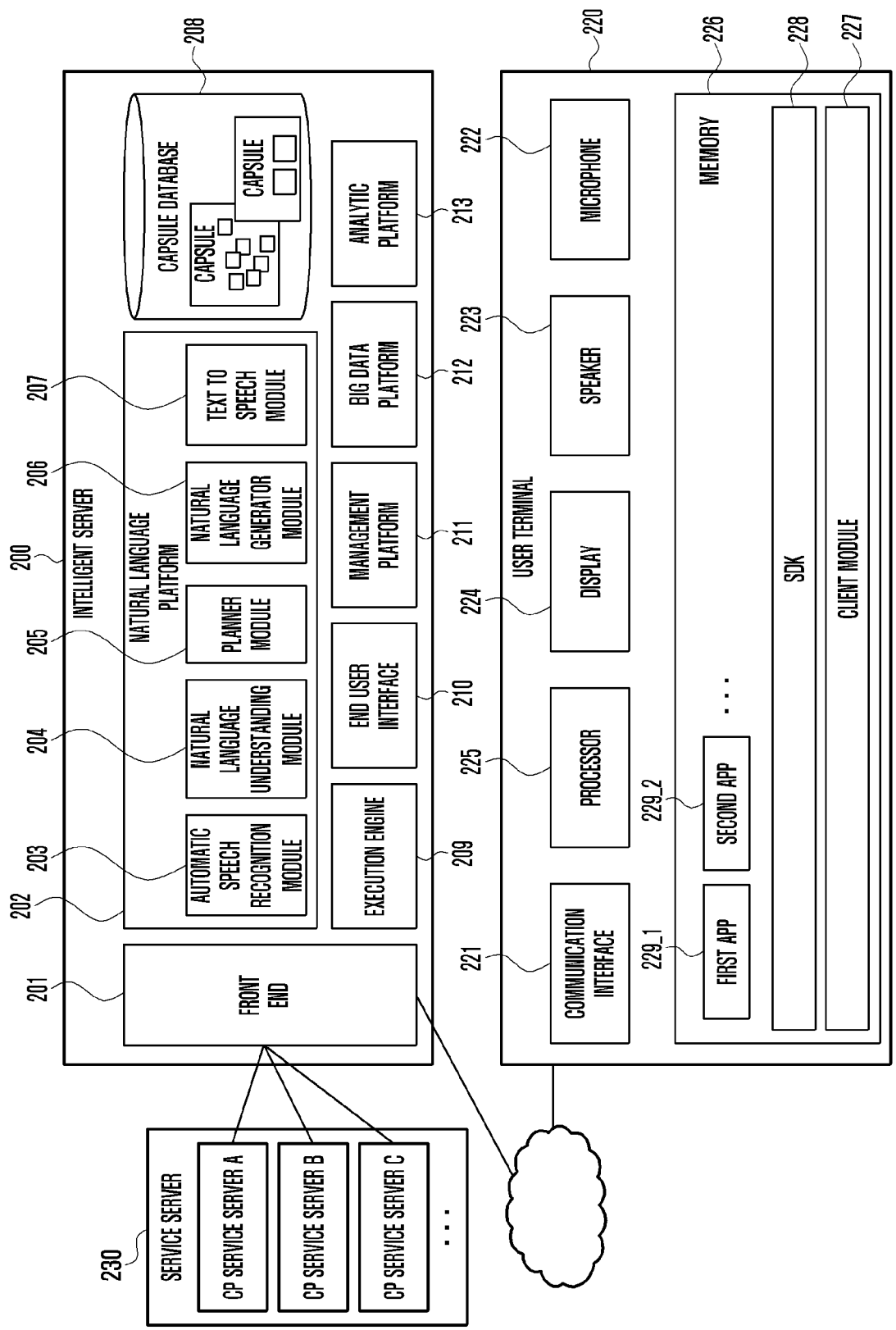
FIG. 2A is a block diagram illustrating an integrated intelligence system according to an embodiment.

FIG. 2A is a block diagram illustrating an integrated intelligence system according to an embodiment.

Referring to FIG. 2A, the integrated intelligence system according to an embodiment may include a user terminal 220, an intelligent server 200, and a service server 230.

The user terminal 220 according to an embodiment may be a terminal device (or an electronic device) capable of being connected to the Internet, and may include, for example, a mobile phone, a smart phone, a personal digital assistant (PDA), a notebook computer, a TV, white goods, a wearable device, an HMD, or a smart speaker.

According to the embodiment, the user terminal 220 may include a communication interface 221, a microphone 222, a speaker 223, a display 224, a memory 226, or a processor 225. The listed elements may be operatively or electrically connected to each other.

The communication interface 221 according to an embodiment may be connected to an external device and configured to transmit and receive data. The microphone 222 according to an embodiment may receive a sound (for example, a user speech) and convert the same to an electrical signal. The speaker 223 according to an embodiment may output the electrical signal in the form of a sound (for example, voice). The display 224 according to an embodiment may be configured to display an image or a video. The display 224 according to an embodiment may display a graphic user interface (GUI) of an executed app (or application).

The memory 226 according to an embodiment store a client module 227, a software development kit (SDK) 228, and a plurality of apps 229. The client module 227 and the SDK 228 may configure framework (or a solution program) for performing a universal function. Further, the client module 227 or the SDK 228 may configure framework for processing a voice input.

The plurality of apps 229 may be programs for performing a predetermined function. According to an embodiment, the plurality of apps 229 may include a first app 229_1 and a second app 229_2. According to an embodiment, each of the plurality of apps 229 may include a plurality of operations for performing predetermined functions. For example, the apps may include an alarm app, a message app, and/or a schedule app. According to an embodiment, the plurality of apps 229 may be executed by the processor 225 so as to sequentially perform at least some of the plurality of operations.

The processor 225 according to an embodiment may control the overall operation of the user terminal 220. For example, the processor 225 may be electrically connected to the communication interface 221, the microphone 222, the speaker 223, and the display 224 to perform predetermined operations.

The processor 225 according to an embodiment may perform a predetermined function by executing a program stored in the memory 226. For example, the processor 225 may perform the following operation for processing a voice input by executing at least one of the client module 227 or the SDK 228. The processor 225 may control, for example, the operation of the plurality of apps 229 through the SDK 228. The following operation which is the operation of the client module 227 or the SDK 228 may be performed by the processor 225.

The client module 227 according to an embodiment may receive a voice input. For example, the client module 227 may receive a voice signal corresponding to a user speech detected through the microphone 222. The client module 227 may transmit the received voice input to the intelligent server 200. The client module 227 may transmit state information of the user terminal 220 along with the received voice input to the intelligent server 200. The state information may be, for example, execution state information of the app.

The client module 227 according to an embodiment may receive the result corresponding to the received voice input. For example, if the intelligent module 200 obtains the result corresponding to the received voice input, the client module 227 may receive the result corresponding to the received voice input. The client module 227 may display the received result on the display 224.

The client module 227 according to an embodiment may receive a plan corresponding to the received voice input. The client module 227 may display the result obtained by performing the plurality of operations of the app on the display 224 according to the plan. The client module 227 may sequentially display, for example, the execution result of the plurality of operations on the display. In another example, the user terminal 220 may display, only some result of the plurality of operations (only the result of the last operation) on the display.

According to an embodiment, the client module 227 may receive a request for acquiring information used for obtaining the result corresponding to the voice input from the intelligent server 200. According to an embodiment, the client module 227 may transmit the information to the intelligent server 200 in response to the request.

The client module 227 according to an embodiment may transmit result information of the execution of the plurality of operations to the intelligent server 200 according to the plan. The intelligent server 200 may identify that the received voice input is correctly processed using the result information.

The client module 227 according to an embodiment may include a voice recognition module. According to an embodiment, the client module 227 may recognize a voice input for performing a limited function through the voice recognition module. For example, the client module 227 may execute an intelligent app for processing a voice input to perform an organic operation through a predetermined input (for example, Wake up!).

The intelligent server 200 according to an embodiment may receive information related to a user voice input from the user terminal 220 through a communication network. According to an embodiment, the intelligent server 200 may change data related to the received voice input into text data. According to an embodiment, the intelligent server 200 may generate a plan for performing a task corresponding to the user voice input on the basis of the text data.

According to an embodiment, the plan may be generated by an artificial intelligent (AI) system. The intelligent system may be a rule-based system, a neural network-based system (for example, a feedforward neural network (FNN)), or a recurrent neural network (RNN)). Alternatively, the intelligent system may be a combination thereof or an intelligent system different therefrom. According to an embodiment, the plan may be selected from a combination of predefined plans or generated in real time in response to a user request. For example, the intelligent system may select at least one plan from among a plurality of predefined plans.

The intelligent server 200 according to an embodiment may transmit the result of the generated plan to the user terminal 220 or transmit the generated plan to the user terminal 220. According to an embodiment, the user terminal 220 may display the result of the plan on the display. According to an embodiment, the user terminal 220 may display the result of the operation according to the plan on the display.

The intelligent server 200 according to an embodiment may include a front end 201, a natural language platform 202, a capsule DB 208, an execution engine 209, and end user interface 210, a management platform 211, a big data platform 212, or an analytic platform 213.

According to an embodiment, the front end 201 may receive the received voice input from the user terminal 220. The front end 201 may transmit a response to the voice input.

According to an embodiment, the natural language platform 202 may include an automatic speech recognition module (ASR module) 203, a natural language understanding (NLU) module 204, a planner module 205, natural language generator (NLG) module 206, or a text to speech (TTS) module 207.

The automatic speech recognition module 203 according to an embodiment may convert the voice input received from the user terminal 220 into text data. The natural language understanding module 204 according to an embodiment may detect a user's intention on the basis of text data of the voice input. For example, the natural language understanding module 204 may detect a user's intention by performing syntactic analysis or semantic analysis. The natural language understanding module 204 according to an embodiment may detect a meaning of a word extracted from the voice input on the basis of a linguistic characteristic of a morpheme or a phrase (for example, grammatical element) and match the detected meaning of the word and the intention so as to determine the user's intention.

The planner module 205 according to an embodiment may generate a plan on the basis of the intention determined by the natural language understanding module 204 and a parameter. According to an embodiment, the planner module 205 may determine a plurality of domains used for performing a task on the basis of the determined intention. The planner module 205 may determine a plurality of operations included in the plurality of domains determined on the basis of the intention. According to an embodiment, the planner module 205 may determine a parameter used for performing the plurality of determined operations or a result value output by the execution of the plurality of operations. The parameter and the result value may be defined by a concept of a predetermined type (or class). According to an embodiment, the plan may include a plurality of operations determined by the user's intention and a plurality of concepts. The planner module 205 may gradually (or hierarchically) determine the relationship between the plurality of operations and the plurality of concepts. For example, the planner module 205 may determine the execution order of the plurality of operations determined on the basis of the user's intention based on the plurality of concepts. In other words, the planner module 205 may determine the execution order of the plurality of operations on the basis of the parameter used for performing the plurality of operations and the result output by the execution of the plurality of operations. Accordingly, the planner module 205 may generate a plan including information on the relationship (ontology) between the plurality of operations and the plurality of concepts. The planner module 205 may generate a plan on the basis of information stored in the capsule database 208 that stores a set of relationships between concepts and operations.

The natural language generator module 206 according to an embodiment may convert predetermined information in the form of text. The information converted into the form of text may be the form of a natural language speech. The text to speech module 207 may convert information in the form of text into information in the form of voice.

According to an embodiment, some or all of the functions of the natural language platform 202 may also be implemented by the user terminal 220.

The capsule database 208 may store information on the relationship between a plurality of concepts and operations corresponding to a plurality of domains. The capsule according to an embodiment may include a plurality of operation objects (action objects or action information) and concept objects (or concept information). According to an embodiment, the capsule database 208 may store a plurality of capsules in the form of a concept action network (CAN). According to an embodiment, the plurality of capsules may be stored in a function registry included in the capsule database 208.

The capsule database 208 may include a strategy registry storing strategy information used when a plan corresponding to a voice input is determined. When there are a plurality of plans corresponding to the voice input, the strategy information may include reference information for determining one plan. According to an embodiment, the capsule database 208 may include a follow-up registry storing the following operation to suggest a follow-up operation to the user in a predetermined situation. The follow-up operation may include, for example, the following speech. According to an embodiment, the capsule database 208 may include a layout registry storing layout information corresponding to information output through the user terminal 220. According to an embodiment, the capsule database 208 may include a vocabulary registry storing vocabulary information included in the capsule information. According to an embodiment, the capsule database 208 may include a dialog registry storing dialog (or interaction) information with the user. The capsule database 208 may update the stored object through a developer tool. The developer tool may include a function editor for updating, for example, the operation object or the concept object. The developer tool may include a vocabulary editor for updating a vocabulary. The developer tool may include a strategy editor for generating and registering strategy to determine a plan. The developer tool may include a dialog editor for generating dialog with the user. The developer tool may include a follow-up editor for activating a follow-up goal and editing the following speech that provides a hint. The follow-up goal may be determined on the basis of the current goal, a user's preference, or an environment condition. According to an embodiment, the capsule database 208 may be implemented inside the user terminal 220.

The execution engine 209 according to an embodiment may obtain the result on the basis of the generated plan. The end user interface 210 may transmit the obtained result to the user terminal 220. Accordingly, the user terminal 220 may receive the result and provide the received result to the user. The management platform 211 according to an embodiment may manage information used by the intelligent server 200. The big data platform 212 according to an embodiment may collect user data. The analytic platform 213 according to an embodiment may manage quality of service (QoS) of the intelligent server 200. For example, the analytic platform 213 may manage elements and a processing speed (or efficiency) of the intelligent server 200.

The service server 230 according to an embodiment may provide a predetermined service (for example, food ordering or hotel booking) to the user terminal 220. According to an embodiment, the service server 230 may be a server operated by a third party. The service server 230 according to an embodiment may provide information for generating a plan corresponding to the received voice input to the intelligent server 200. The provided information may be stored in the capsule database 208. Further, the service server 230 may provide result information of the plan to the intelligent server 200.

In the integrated intelligence system described above, the user terminal 220 may provide various intelligent services to the user in response to the user input. The user input may include, for example, an input through a physical button, a touch input, or a voice input.

According to an embodiment, the user terminal 220 may provide a voice recognition service through an intelligent app (or a voice recognition app) stored in the user terminal 220. In this case, for example, the user terminal 220 may recognize a user speech (utterance) or a voice input received through the microphone and provide a service corresponding to the recognized voice input to the user.

According to an embodiment, the user terminal 220 may perform a predetermined operation on the basis of the received voice input along or together with the intelligent server and/or the service server. For example, the user terminal 220 may execute an app corresponding to the received voice input and perform a predetermined operation through the executed app.

According to an embodiment, when the user terminal 220 provides the service together with the intelligent server 200 and/or the service server, the user terminal may detect a user speech through the microphone 222 and generate a signal (or voice data) corresponding to the detected user speech. The user terminal may transmit the voice data to the intelligent server 200 through the communication interface 221.

The intelligent server 200 according to an embodiment may generate a plan for performing a task corresponding to the voice input or the result of the operation according to the plan in response to the voice input received from the user terminal 220. The plan may include, for example, a plurality of operations for performing a task corresponding to the voice input of the user and a plurality of concepts related to the plurality of operations. The concepts may be parameters input to execution of the plurality of operations or may be defined for result values output by the execution of the plurality of operations. The plan may include the relationship between the plurality of operations and the plurality of concepts.

The user terminal 220 according to an embodiment may receive the response through the communication interface 221. The user terminal 220 may output a voice signal generated by the user terminal 220 to the outside through the speaker 223 or output an image generated by the user terminal 220 to the outside through the display 224.

Figure 2B:
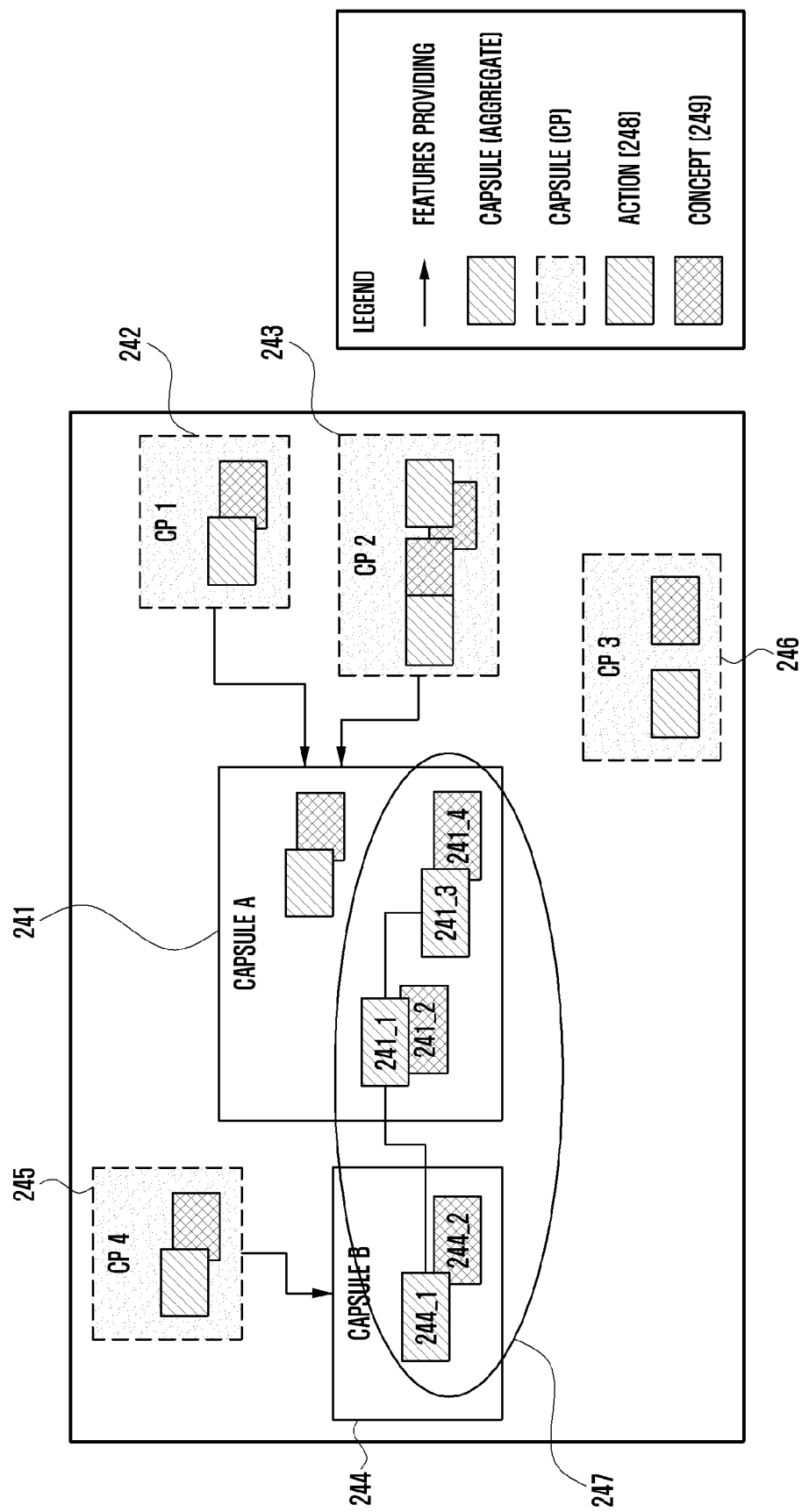
FIG. 2B illustrates the form in which information on the relationship between concepts and actions is stored in a database according to an embodiment.

FIG. 2B illustrates the form in which information on the relationship between concepts and operations is stored in a database according to various embodiments.

A capsule database (for example, the capsule database 208) of the intelligent server 200 may store capsules in the form of a concept action network (CAN). The capsule database may store an operation for processing a task corresponding to a user voice input and a parameter used for the operation in the form of a concept action network (CAN).

The capsule database may store a plurality of capsules (capsule A 241 and capsule B 244) corresponding to a plurality of domains (for example, applications). According to an embodiment, one capsule (for example, capsule A 241) may correspond to one domain (for example, location (geo) or application). Further, one capsule may correspond to at least one service provider (for example, CP #1 242, CP #2 243, CP #3 246, and CP #4 245) for performing a function of a domain related to the capsule. According to an embodiment, one capsule may include one or more operations for performing a predetermined function and one or more concepts.

The natural language platform 202 may generate a plan for performing a task corresponding to the received voice input through the capsules stored in the capsule database. For example, the planner module 205 of the natural language platform may generate a plan through capsules stored in the capsule database. For example, a plan 247 may be generated using operations 241_1 and 241_3 and concepts 241_2 and 241_4 of capsule A 241 and an operation 244_1 and a concept 244_2 of capsule B 244.

Figure 2C:
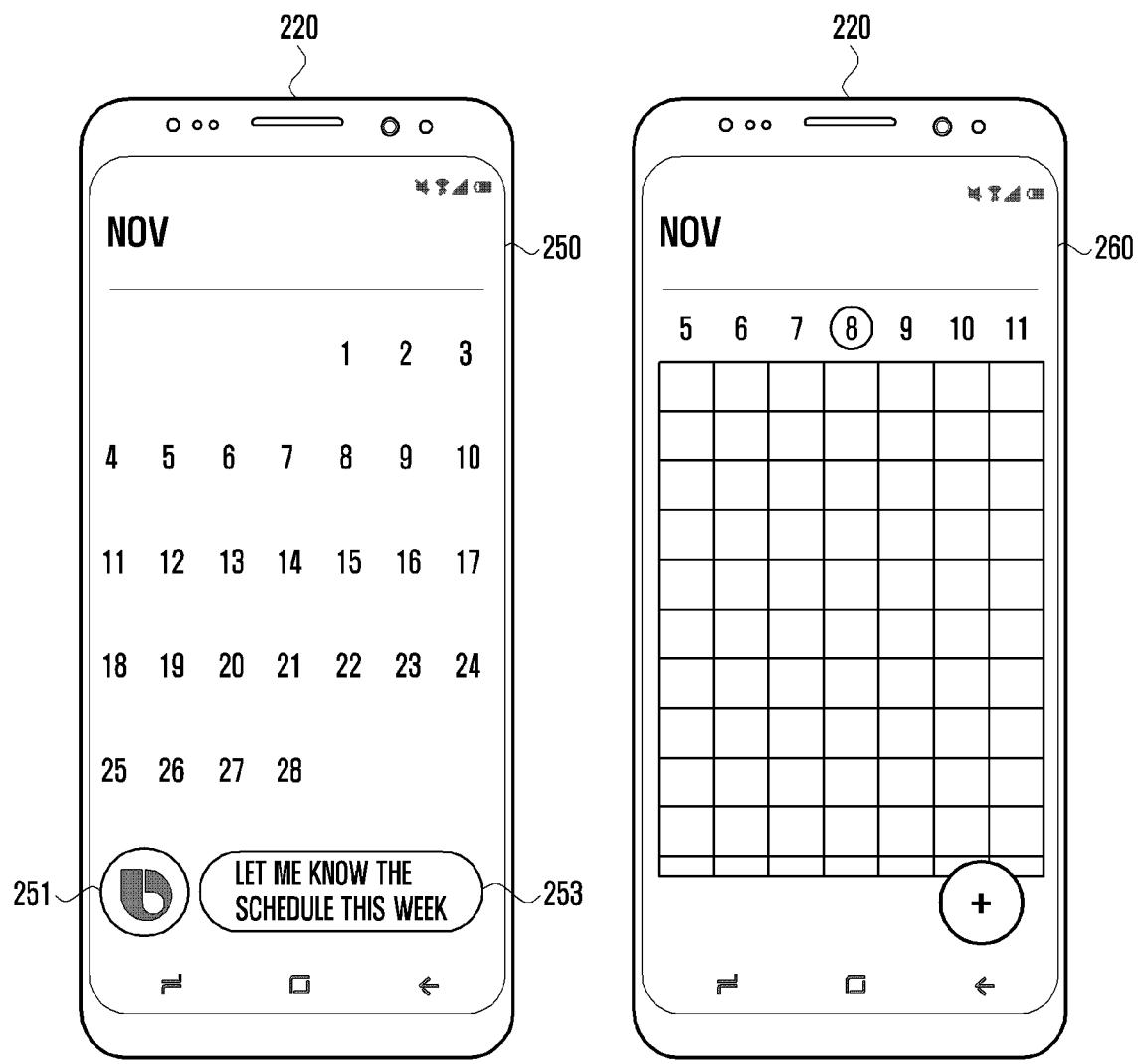
FIG. 2C illustrates a user terminal displaying a screen in which a received voice input is processed through an intelligent app according to an embodiment.

FIG. 2C illustrates screens on which the user terminal processes a received voice input through an intelligent app according to various embodiments.

The user terminal 220 may execute an intelligent app in order to process a user input through the intelligent server 200.

According to an embodiment, in a screen 250, when recognizing a predetermined voice input (for example, wake up!) or receiving an input through a hardware key (for example, a dedicated hardware key), the user terminal 220 may execute an intelligent app for processing the voice input. The user terminal 220 may execute the intelligent app in the state in which, for example, a schedule app is executed. According to an embodiment, the user terminal 220 may display an object 251 (for example, icon) corresponding to the intelligent app on the display 224. According to an embodiment, the user terminal 220 may receive the voice input by a user speech. For example, the user terminal 220 may receive the voice input "Let me know my schedule this week!". According to an embodiment, the user terminal 220 may display a user interface (UI) 253 (for example, an input window) of the intelligent app displaying text data of the received voice input on the display.

According to an embodiment, in a screen 260, the user terminal 220 may display the result corresponding to the received voice input on the display. For example, the user terminal 220 may receive a plan corresponding to the received user input and display the "schedule this week" according to the plan on the display.

An electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
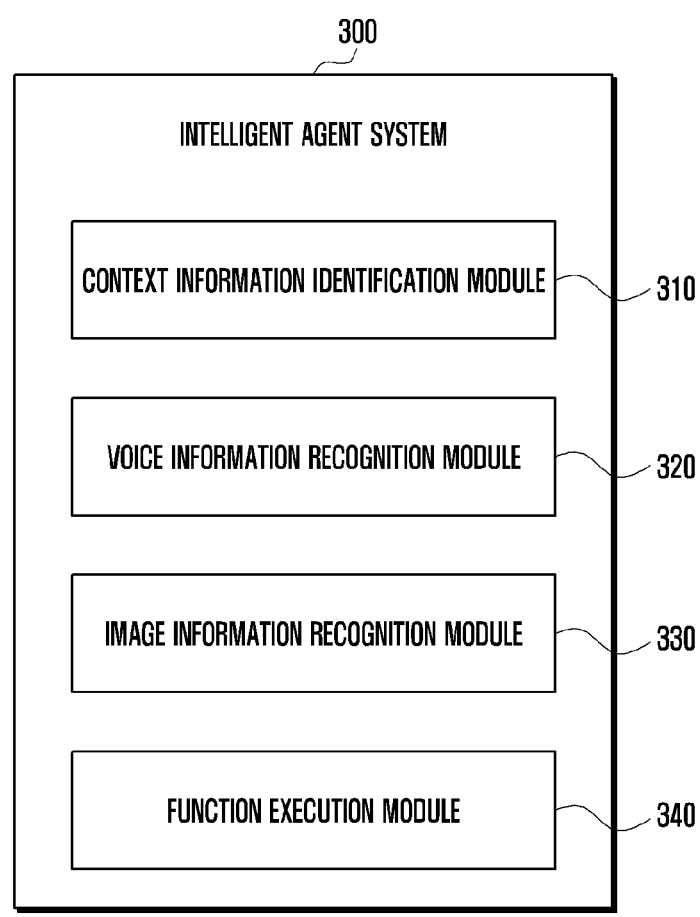
FIG. 3 schematically illustrates an intelligent agent system according to various embodiments of the disclosure.

FIG. 3 schematically illustrates an intelligent agent system according to various embodiments of the disclosure.

According to various embodiments, the electronic device 101 may perform a function according to a user's command through an intelligent agent system 300. For example, the intelligent agent system 300 may include a context information identification module 310, a voice information recognition module 320, an image information recognition module 330, and a function execution module 340. The intelligent agent system 300 of FIG. 3 may include at least some elements or modules of the integrated intelligent system in FIGS. 2A to 2C or may correspond to a combination of at least some elements or modules.

According to various embodiments, the context information identification module 310 may identify at least one piece of context information related to the electronic device 101. For example, the context information may include a level of noise around the electronic device 101. If the user of the electronic device 101 attends a concert, the context information identification module 310 may acquire and store information indicating that it is very noisy around the electronic device 101 as the context information. In another example, the context information may include information on an application being executed by the electronic device 101. The context information identification module 310 may acquire the information on the application being executed, such as a video or music being reproduced by the electronic device 101, as the context information. With respect to a specific application, the context information identification module 310 may acquire information on an operation state of the specific application as the context information. For example, if the specific application is a video application, the context information identification module 310 may identify whether the video is currently reproduced or stopped. In another example, the context information identification module 310 may identify whether the specific application is being executed in a foreground or a background. The electronic device 101 may use at least one piece of context information acquired by the context information identification module 310 to provide an intelligent agent function by the electronic device 101.

According to various embodiments, the voice information recognition module 320 may receive a user's voice and determine what a user's command is on the basis of the received voice. For example, the voice information recognition module 320 may convert a voice into text using automatic speech recognition (ASR) and perform a function based on the converted text.

According to various embodiments, if it is very noisy around the electronic device 101, the voice cannot be smoothly received from the user. In another example, if a place in which the user is located is a library where silence is required, the user may user may have difficulty inputting with a loud voice. In the above case, the electronic device 101 may have a difficulty in performing the intelligent agent service through the voice input.

According to various embodiments, the image information recognition module 330 may receive information on a user image through the camera module 180 of the electronic device 101 may perform lip reading on the basis of the received image information. For example, the lip reading may be a technology for analyzing motion of a user's lips and recognizing a word or a sentence. The image information recognition module 330 may use a method of finding the most suitable word or sentence on the basis of the received lip image through a trained model. Accordingly, unlike the voice information recognition module 320, the image information recognition module may not generate text.

As described above, if it is difficult to identify a function which the user desires to perform only through the user's voice, the lip leading may be performed on the basis of the received image information and thus the accuracy of the intelligent agent service can be improved.

According to various embodiments, the image information recognition module 330 may identify a user's command only through lip reading of the user on the basis of context information acquired by the context information identification module 310 without reception of voice information and perform a function corresponding to the identified user's command.

According to various embodiments, the image information recognition module 330 may compensate for voice information to be processed by the voice information recognition module 320 through lip reading. The electronic device 101 may identify a user's command by combining voice information and lip reading information and perform a function corresponding to the identified user's command.

According to various embodiments, the image information recognition module 330 may identify the number of lips included in the image, a user who is making a voice command, and information on a start point or an end point of the speech.

According to various embodiments, the image information recognition module 330 may provide at least one piece of information related to lip reading to the user interface. For example, the image information recognition module 330 may provide the user interface with information indicating whether lip reading is being performed, information on lips included in the image, information on a lip performing lip reading, or information on a lip reading error.

According to various embodiments, the image information recognition module 330 may provide a guide about lip reading in order to facilitate lip reading. For example, the image information recognition module 330 may provide a close up of a user's lips and provide the same through a separate preview screen. In another example, if it is difficult to detect a user's lips in the received image, the image information recognition module 330 may guide the electronic device 101 to control orientation.

According to various embodiments, if the number of lips included in the image is plural, the image information recognition module 330 may display the lips such that the lip recognized to be currently making a speech is distinguished from other lips simply included in the image. For example, the lip determined to be actually making the voice command may be displayed with borders around a peripheral region thereof, and the lips simply included in the image may be displayed without special indication. In another example, the lips determined to be actually inputting the voice command may be displayed with a first border therearound, and lips simply included in the image may be displayed with a second border therearound. A shape (for example, a solid line or a dotted line), a color, and a thickness of the first border may be different from those of the second border.

According to various embodiments, the function execution module 340 may determine what a user's command is on the basis of at least one piece of context information of the electronic device 101, voice information, or image information and perform a function corresponding to the determined command.

Figure 4:
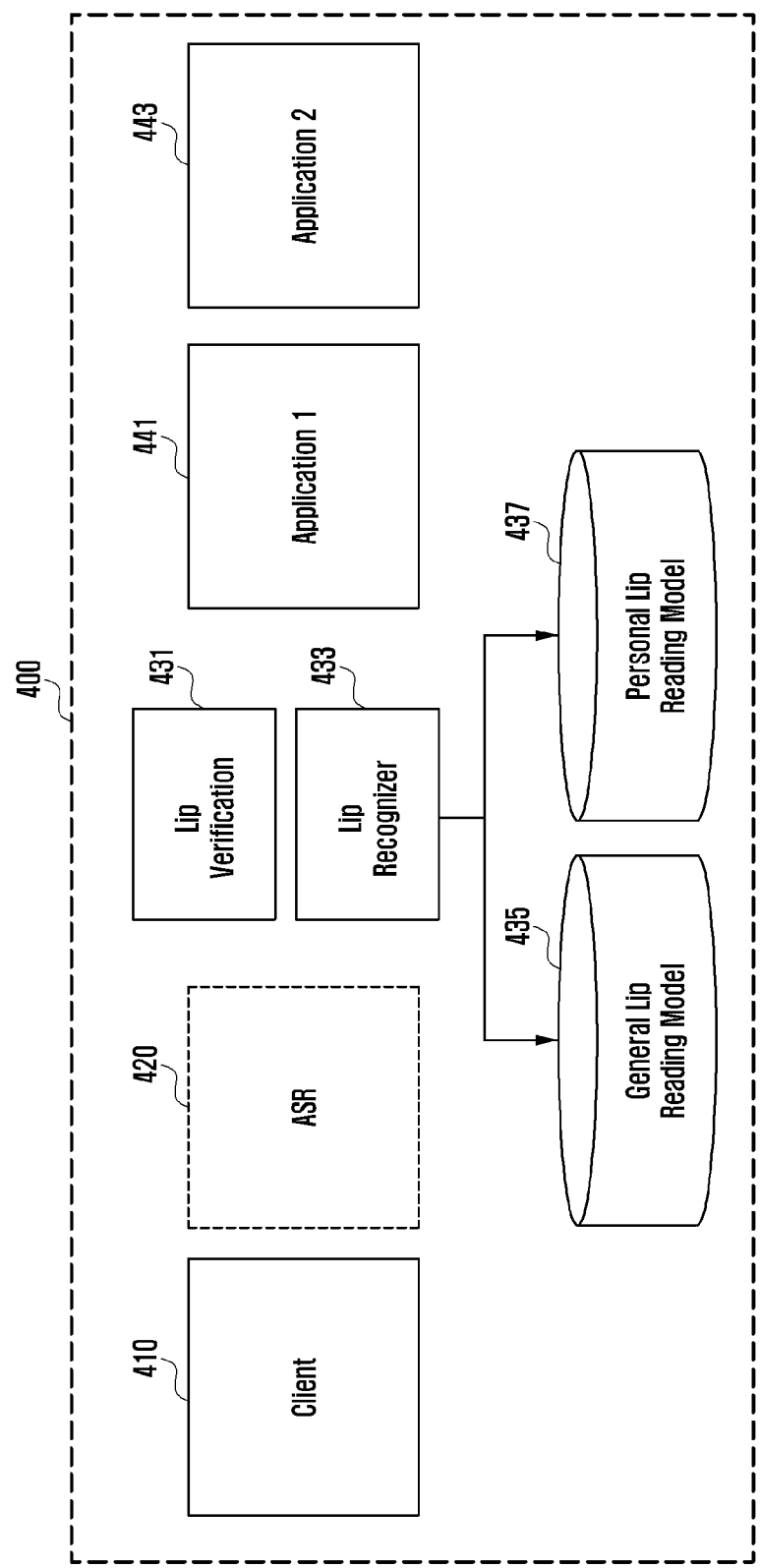
FIG. 4 is a block diagram illustrating a lip reading module according to various embodiments of the disclosure.

FIG. 4 is a block diagram illustrating an electronic device for performing lip reading according to various embodiments of the disclosure.

According to various embodiments, an electronic device 400 (for example, the electronic device 101 of FIG. 1 or the user terminal 220 of FIG. 2A) may be divided into a plurality of modules for performing lip reading.

According to various embodiments, a client module 410 may serve to access an intelligent agent service and output the result of the intelligent agent service. For example, the client 410 may perform a lip reading function according to information on an application currently being executed and context of the electronic device 400.

According to various embodiments, an automatic speech recognition (ARS) module 420 may convert an input voice signal into text.

According to various embodiments, a lip verification module 431 may identify whether lips are detected in image information acquired through the camera module 180 and identify whether movement of the lip can be recognized. For example, the lip identification module 431 may determine whether the image information acquired through the camera module corresponds to an image in which the lips can be recognized and determine whether to continue lip recognition or perform only voice recognition.

According to various embodiments, a lip recognizer module 433 may detect movement of the lips on the basis of a general lip reading model 435 and a personal lip reading model 437 in a recognized lip area and recognize or estimate a user speech.

According to various embodiments, the general lip reading model 435 is a model learned on the basis of a plurality of unspecified lip movements and speech information corresponding thereto and may secure the recognition performance of general lip reading.

According to various embodiments, the personal lip reading model 437 may secure the recognition performance optimized for the user of the electronic device 400 by learning movement of the user's lips to generate a model. For example, since every person has different a speech habit and lip movement, performance deterioration may individually occur, and thus the recognition performance of lip reading may be improved through the personal lip reading model 437.

According to various embodiments, the following operation may be performed through electronic device 400. For example, if the intelligent agent service is executed by a user input (for example, press of a physical key or a speech of wake-up), context information of an application 441 or 443 being executed is received. For example, if a video or music is being reproduced, a camera module may be activated to recognize lips. If it is determined that lips can be recognized on the basis of image information collected from the camera module, it is determined what a user speech is through the received user speech and lip movement.

Figure 5:
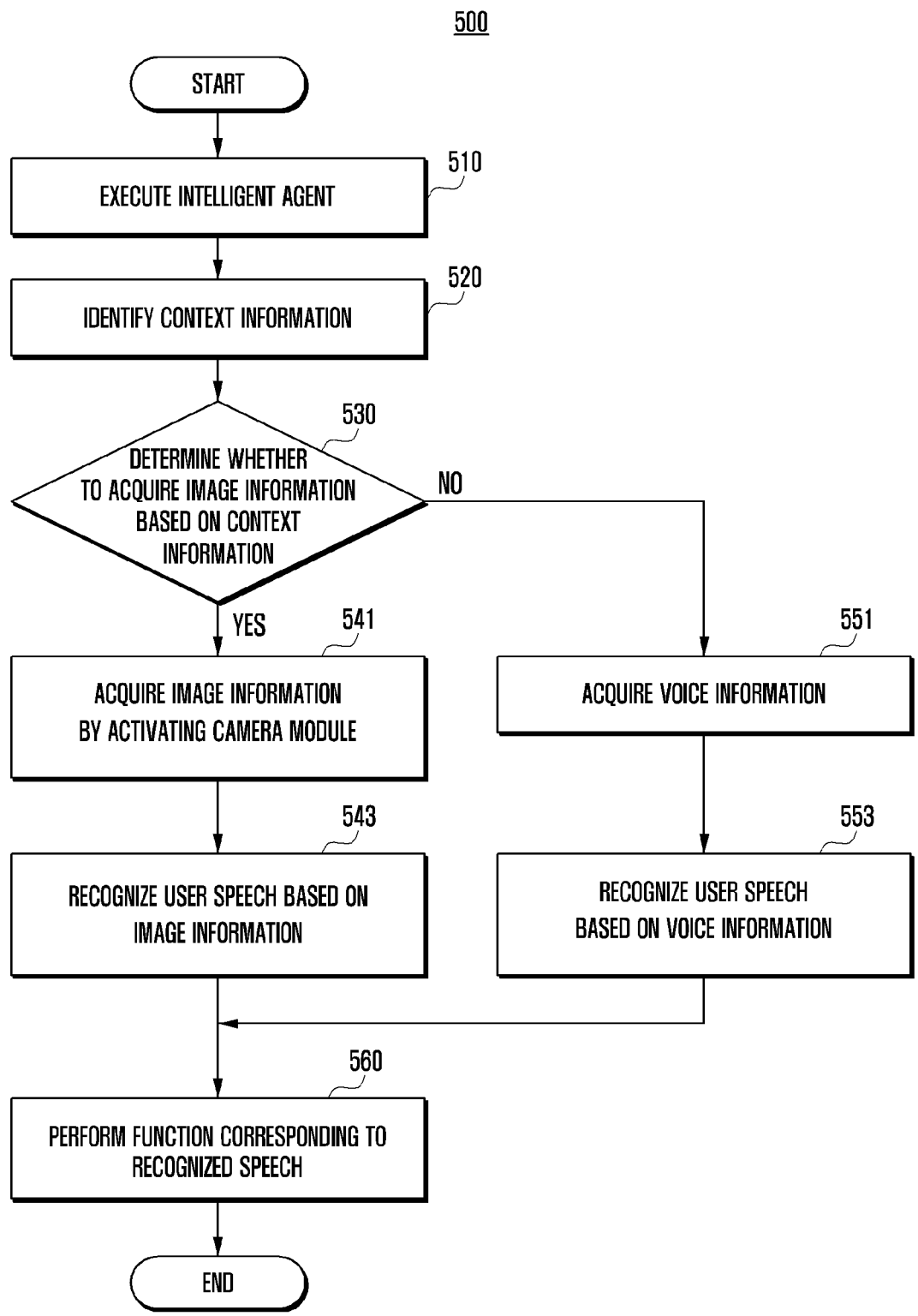
FIG. 5 is a flowchart illustrating a method by which an electronic device performs a function corresponding to a user command through an intelligent agent service according to various embodiments of the disclosure.

FIG. 5 is a flowchart illustrating a method 500 of performing a function corresponding to a user command through an intelligent agent service of an electronic device according to various embodiments of the disclosure.

According to various embodiments, the electronic device 101 may execute an intelligent agent service in operation 510. For example, the electronic device 101 may execute the intelligent agent service by receiving a user input (for example, press of a physical key or a speech of wake-up).

According to various embodiments, the electronic device 101 may identify context information of the electronic device 101 in operation 520. For example, the context information may include a level of noise around the electronic device 101. In another example, the context information may include information on an application being executed by the electronic device 101.

According to various embodiments, the electronic device 101 may determine whether to acquire image information on the basis of the identified context information in operation 530. For example, if noise around the electronic device 101 is serious, a voice cannot be smoothly received from the user, and thus the electronic device 101 may perform control to acquire image information. In another example, if the user is located in a place where silence is required, the user has a difficulty in inputting an input with a loud voice. In the above case, through additional acquisition of the image information, the accuracy of the intelligent agent service can be improved.

According to various embodiments, if it is determined to acquire image information, the electronic device 101 may acquire information on an image of the user by activating the camera module in operation 541.

According to various embodiments, the electronic device 101 may recognize a user speech on the basis of the acquired image information in operation 543.

According to various embodiments, if it is determined not to acquire image information, the electronic device 101 may acquire voice information from the user in operation 551.

According to various embodiments, the electronic device 101 may recognize a user speech on the basis of the voice information in operation 553.

According to various embodiments, the electronic device 101 may perform a function corresponding to generated text in operation 560.

According to various embodiments, referring to FIG. 5, the electronic device 101 may selectively acquire image information or voice information and execute a function corresponding to a user speech. However, the disclosure is not limited to the embodiments but may include an embodiment in which the electronic device acquires both the image information and the voice information and performs a function corresponding to a user speech based on a combination thereof (for example, a combination speech).

Figure 6:
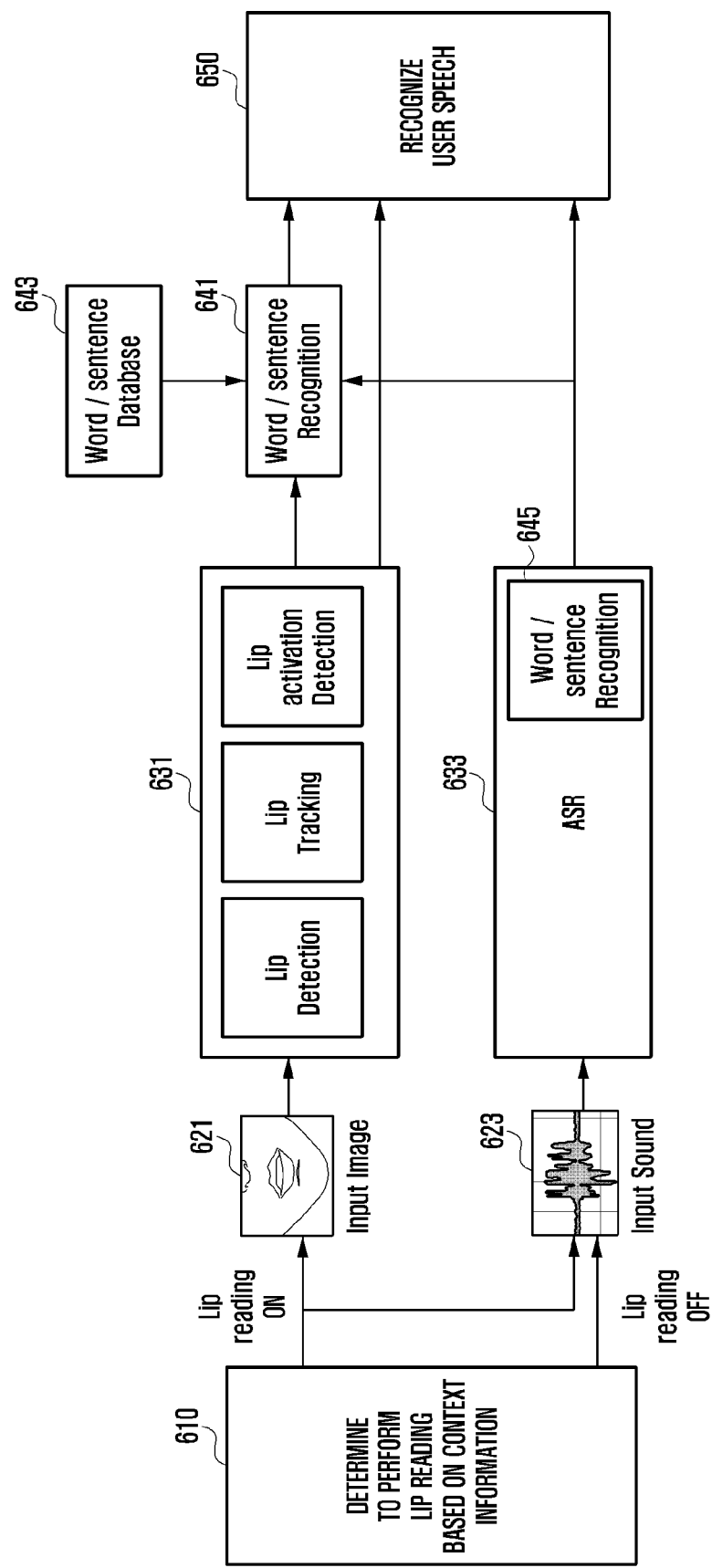
FIG. 6 illustrates a method by which an electronic device recognizes a user speech on the basis of at least one of a user voice or a user's lip shape according to various embodiments of the disclosure.

FIG. 6 illustrates a method by which an electronic device recognizes a user speech on the basis of at least one of a user voice or a user's lip shape according to various embodiments of the disclosure.

According to various embodiments, the electronic device 101 may determine whether to perform lip reading on the basis of context information in operation 610. If it is determined to perform lip reading, the electronic device may acquire information on an image of the user in operation 621. If it is determined not to perform lip reading, the electronic device may acquire voice information in operation 623. In another example, even when it is determined to perform lip reading, the electronic device 101 may additionally acquire voice information in operation 623.

According to various embodiments, if image information is acquired through lip reading, the electronic device 101 may identify information 631 on the lips. For example, a method of identifying the lip information 631 may include lip detection, lip activation detection, and lip tracking. For example, the lip tracking may be detection of a user's lips in the image information. For example, the lip activation detection may be detection of a start of movement of the lips. For example, the lip tracking may be continuous tracking of a shape change of the lips starting movement.

According to various embodiments, the electronic device 101 may recognize a user speech on the basis of the lip information 631 (for example, recognize a user speech only through lip movement).

According to various embodiments, the electronic device 101 may convert a user's voice into text through the automatic speech recognition module 633 in step 645 (for example, convert a user speech into text only through the received voice).

According to various embodiments, the electronic device 101 may recognize a user speech by combining the lip information 631 and the information acquired from the automatic speech recognition module 633 in step 641 (for example, recognize a user speech by combining the received voice and the lip movement).

According to various embodiments, if the electronic device 101 acquires image information through lip reading, the electronic device 101 may refer to a database 643 in order to recognize a user speech. The corresponding database 643 may be stored in a server or the memory 130 in the electronic device 101.

According to various embodiments, the electronic device 101 may recognize a user speech corresponding to the converted text in operation 650.

Figure 7:
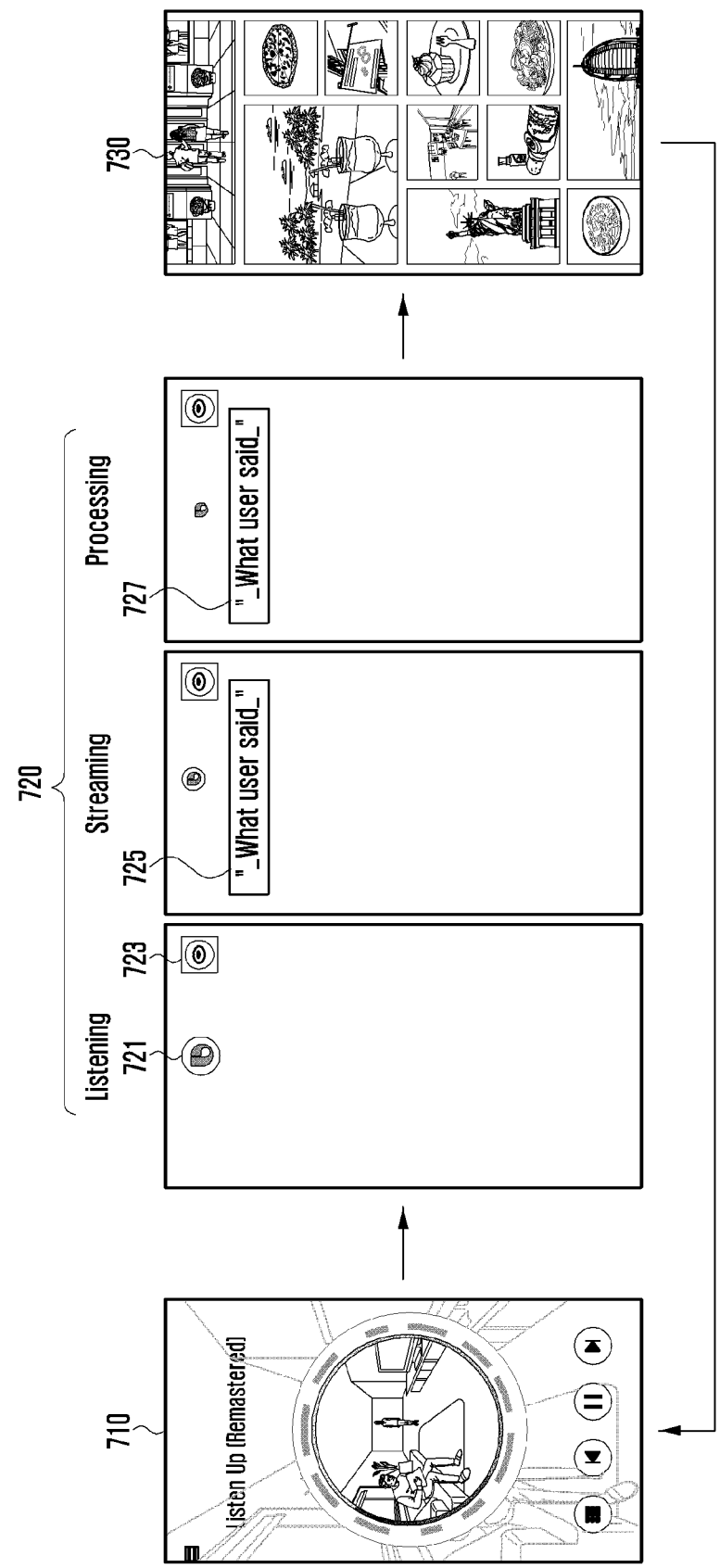
FIG. 7 illustrates a user interface when an electronic device performs a function through an intelligent agent service according to various embodiments of the disclosure.

FIG. 7 illustrates a user interface when an electronic device performs a function through an intelligent agent service according to various embodiments.

According to various embodiments, referring to reference numeral 710, the electronic device 101 may execute a first application (for example, a music reproduction application). The electronic device 101 may receive an input for activating an intelligent agent service from the user while the first application is executed.

According to various embodiments, referring to reference numeral 720, if the first application (for example, the music reproduction application) is continuously executed in a background seamlessly (for example, music is being reproduced) in the state in which the intelligent agent service is activated, the electronic device 101 may receive at least one piece of a user's voice and information on the lips through the intelligent agent service. For example, the electronic device 101 may display information indicating that the intelligent agent service is activated and thus at least one piece of the voice and the lip information is received through a separate object or an icon 721.

According to various embodiments, referring to reference numeral 720, if the camera module 180 is activated to perform lip reading, the electronic device 101 may display a separate object or an icon 723 in order to inform the user of the same. For example, the lip reading object or the icon 723 may be displayed with a change in the state depending on the state of lip reading. For example, if movement of the user's lips is accurately read, the object or the icon 723 may be clearly displayed. If it is difficult to detect movement of the user's lips (for example, if detection of the lip location fails or if it is dark around the user), the object or the icon 723 may be blurredly displayed or it may flicker. In another example, if movement of the user's lip is accurately read, the object or the icon 723 may be displayed with a first color. If it is difficult to detect movement of the user's lips (for example, if detection of the lip location fails or if it is dark around the user), the object or the icon 723 may be displayed with a second color different from the first color.

According to various embodiments, referring to reference numeral 720, the electronic device 101 may display the result of conversion from the user speech to text in real time. For example, the electronic device 101 may provide the user with an intermediate result 725 while the user speaks, and if the user finishes the speech, may provide the user with a final result 727.

According to various embodiments, referring to reference numeral 720, the electronic device 101 may temporarily stop music currently reproduced through the music reproduction application in order to receive a command from the user. In this case, since music which is currently reproduced is stopped, the user's voice may be more smoothly received. However, the user cannot listen to music seamlessly, it may inconvenience the user.

According to various embodiments, referring to reference numeral 730, if the user speech corresponds to execution of the second application (for example, a gallery), the electronic device 101 may switch the screen to the second application. Thereafter, if a back input is received from the user, the electronic device 101 may return to an execution screen of the first application.

Figure 8A:
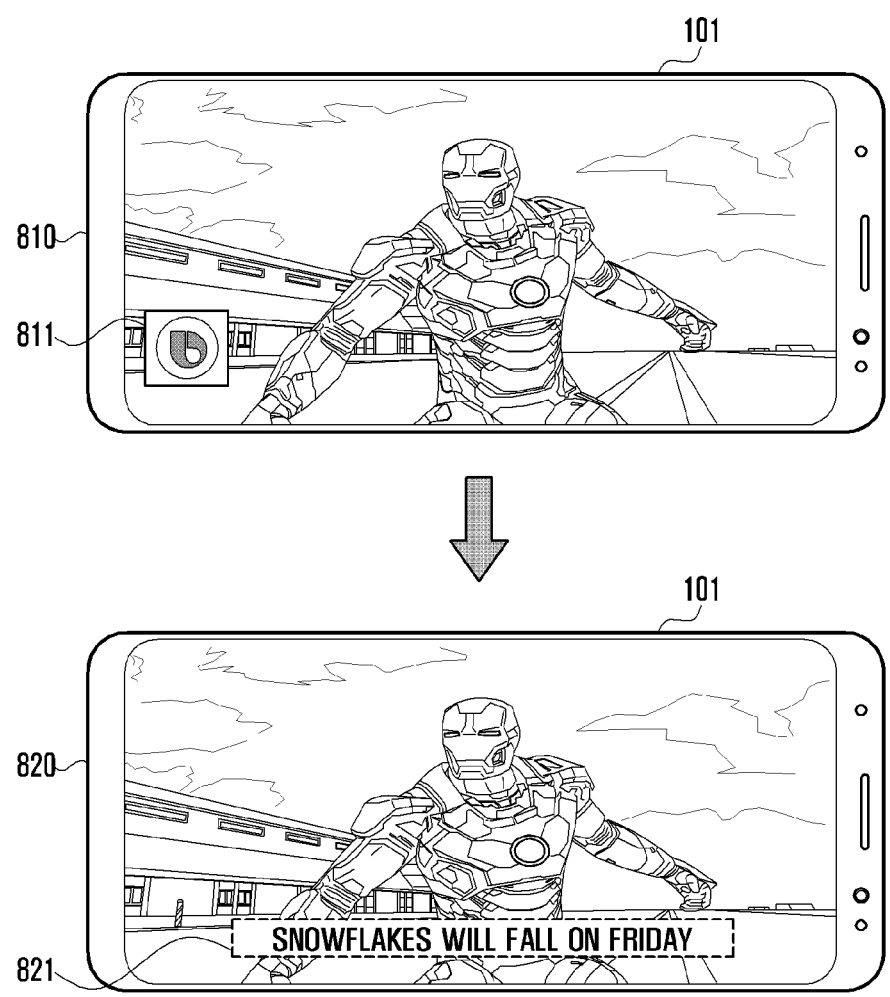
FIG. 8A to 8B illustrate a user interface when an electronic device performs a function through an intelligent agent service according to various embodiments of the disclosure.
Figure 8B:
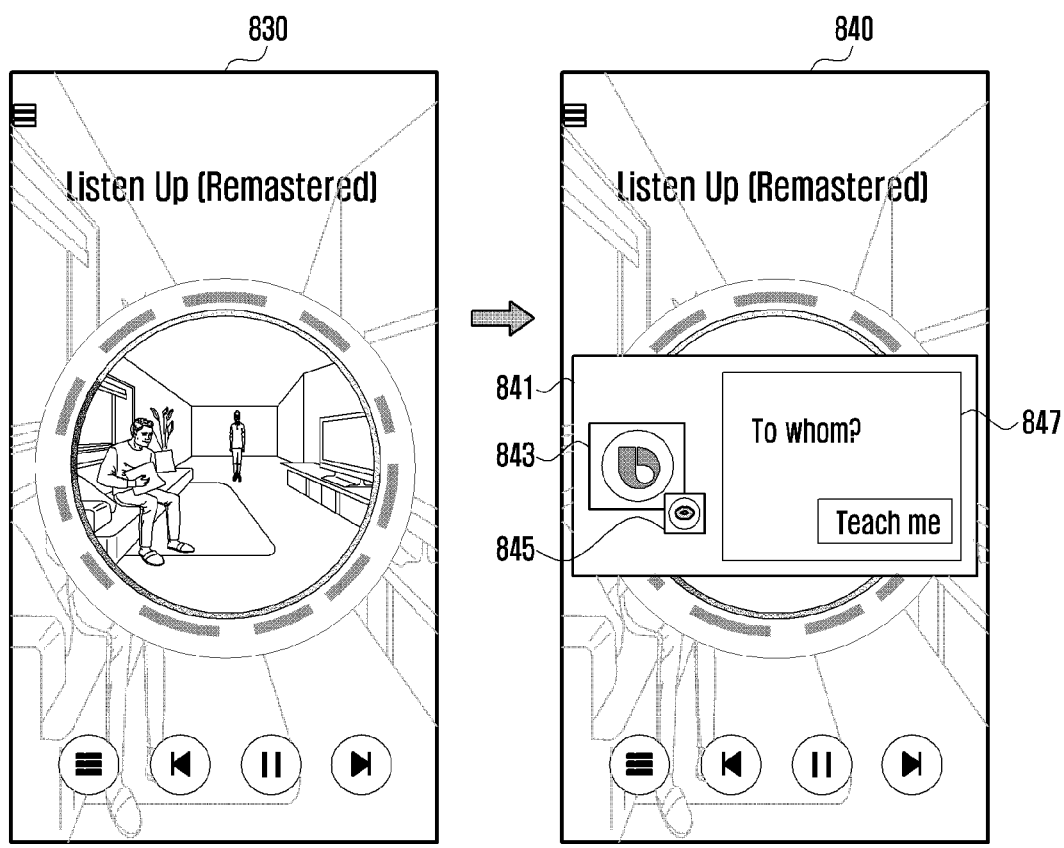

FIG. 8A to 8B illustrate a user interface when an electronic device performs a function through an intelligent agent service according to various embodiments of the disclosure.

According to various embodiments, referring to FIG. 8A, the electronic device 101 may reproduce a movie through a video reproduction application in a screen 810. In such a situation, the electronic device 101 may receive an input for activating the intelligent agent service from the user. The electronic device 101 may receive the input from the user while the reproduced video is not paused or stopped. For example, the electronic device 101 may identify context information indicating that the currently executed application is a video reproduction application and that a movie is currently reproduced through the video reproduction application. In order not to interrupt the user watching a movie, the electronic device 101 may activate a lip reading mode while not stopping reproduction of the video and detect movement of the user's lips. Of course, in this case, a user's voice may also be received, and the electronic device 101 may recognize a command which the user desires to execute on the basis of the user's voice and lip movement. Meanwhile, the electronic device 101 may display an object or an icon 811 informing of activation of the lip reading mode through a user interface.

According to various embodiments, referring to FIG. 8A, the electronic device 101 may receive an input inquiring about weather on Friday from the user in a screen 820. In response thereto, the electronic device 101 may provide the response "Snowflakes will fall on Friday". Since the user is currently watching a movie, if the electronic device 101 responds through a separate voice or hide the currently executed application and switches the screen to the intelligent agent service screen, smooth watching of the movie may be interrupted. Accordingly, the electronic device 101 may display a response 821 corresponding to a user command in the form similar to subtitles without a separate voice response or screen switching.

According to various embodiments, referring to FIG. 8B, the electronic device 101 may reproduce music through a music reproduction application in a screen 830. In such a situation, the electronic device 101 may receive an input for activating the intelligent agent service from the user. The electronic device 101 may receive the input from the user while the reproduced music is not paused or stopped. For example, the electronic device 101 may identify context information indicating that the currently executed application is a music reproduction application and that music is currently reproduced through the music reproduction application. In order not to interrupt the user listening to music, the electronic device 101 may activate a lip reading mode while not stopping reproduction of the music and detect movement of the user's lips. Of course, in this case, a user's voice may also be received, and the electronic device 101 may recognize a command which the user desires to execute on the basis of the user's voice and lip movement.

According to various embodiments, referring to FIG. 8B, the electronic device 101 may recognize a request for transmitting a message from the user in a screen 840. In response thereto, the electronic device 101 may provide a response 841 "To whom? 847" means that a question asking to whom the message transmitted. In addition, the electronic device 101 may display an indicator 843 indicating that user feedback is currently received and display an object or an icon 845 indicating that lip reading is being executed. The indicator, the object, or the icon is a graphic user interface used to refer to something and may be used as a similar meaning but can be replaced with another expression. Similar to FIG. 8A, since the user is currently listening to music, if the electronic device 101 responds through a separate voice or hides the currently executed application and switches the screen to the intelligent agent service screen, uninterrupted listening of the music may be interrupted. Accordingly, the electronic device 101 may display a response 841 corresponding to a user command in a partial area in which the currently executed application is displayed in the form similar to a message without a separate voice response.

Figure 9:
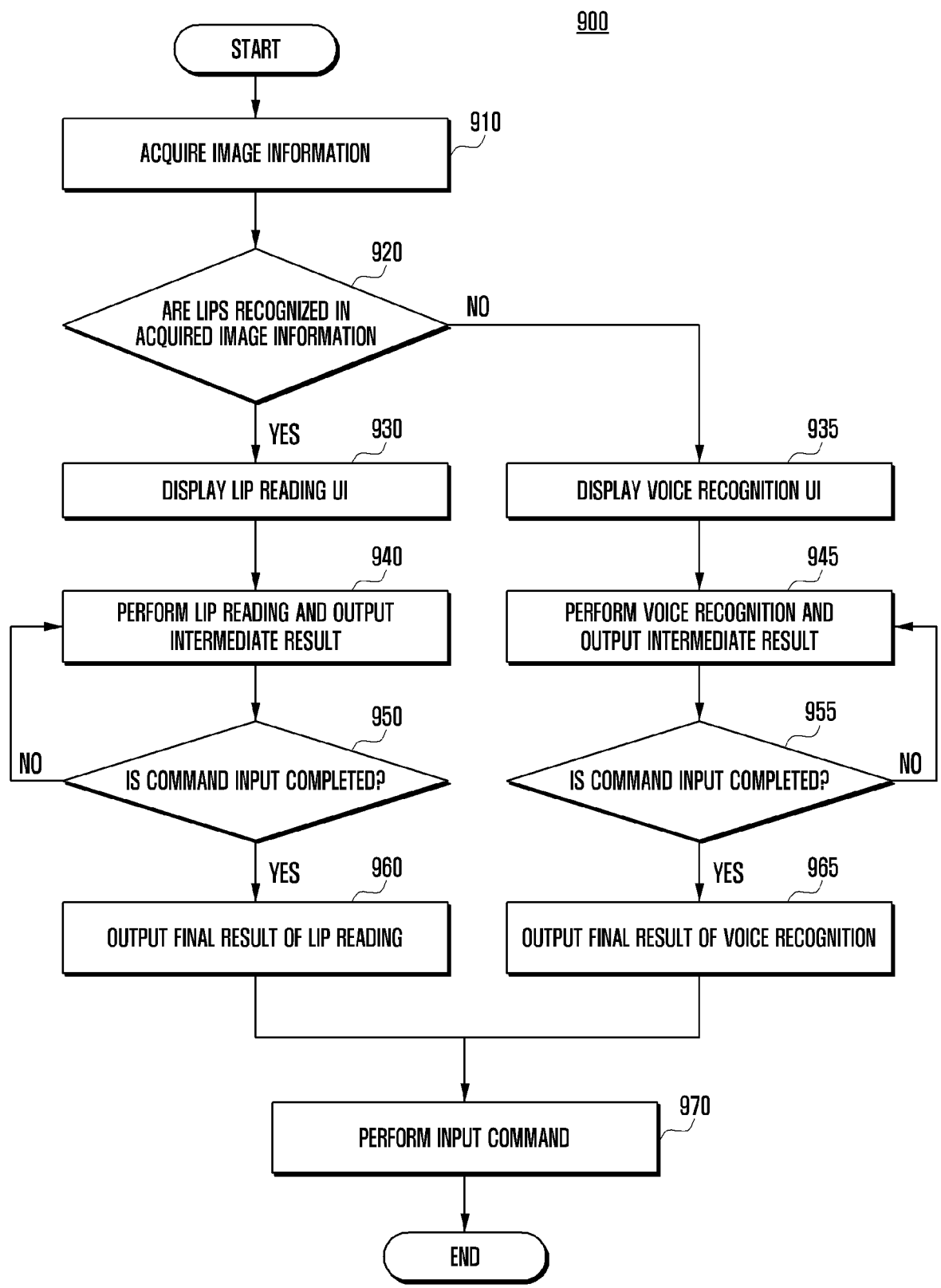
FIG. 9 is a flowchart illustrating a method of performing a function corresponding to a user command on the basis of whether an electronic device can perform lip reading according to various embodiments of the disclosure.

FIG. 9 is a flowchart illustrating a method 900 of performing a function corresponding to a user command on the basis of whether the electronic device is capable of lip reading according to various embodiments of the disclosure.

According to various embodiments, the electronic device 101 may acquire information on an image of the user in operation 910.

According to various embodiments, the electronic device 101 may determine whether lips can be recognized (for example, whether lip reading can be performed) in the acquired image information in operation 920.

According to various embodiments, if the lips can be recognized, the electronic device 101 may display a user interface (UI) for lip reading in operation 930.

According to various embodiments, the electronic device 101 may perform lip reading and output an intermediate result of the lip reading in operation 940.

According to various embodiments, the electronic device 101 may determine whether the input of the user command is completed in operation 950.

According to various embodiments, if the input of the user command is completed, the electronic device 101 may output the final result of the lip reading in operation 960.

According to various embodiments, if the input of the user command is not completed, the electronic device 101 may continue the lip reading and output the intermediate result of the lip reading in operation 940.

According to various embodiments, if the lip cannot be recognized, the electronic device 101 may display a user interface (UI) for voice recognition in operation 935.

According to various embodiments, the electronic device 101 may perform voice recognition and output the intermediate result for voice recognition in operation 945.

According to various embodiments, the electronic device 101 may determine whether the input of the user command is completed in operation 955.

According to various embodiments, if the input of the user command is completed, the electronic device 101 may output the final result of voice recognition in operation 965.

According to various embodiments, if the input of the user command is not completed, the electronic device 101 may continue the voice recognition and output the intermediate result for the voice recognition in operation 945.

According to various embodiments, the electronic device 101 may perform an input command on the basis of at least one of the final result of lip reading and the final result of voice recognition in operation 970.

Figure 10A:
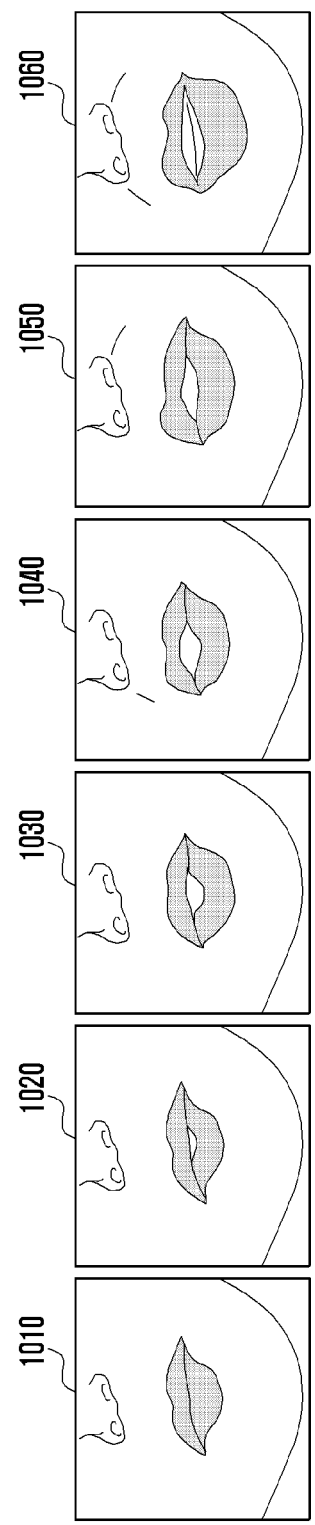
FIG. 10A to 10C schematically illustrate a method of providing a user interface for a lip reading operation of an electronic device according to various embodiments of the disclosure.
Figure 10B:
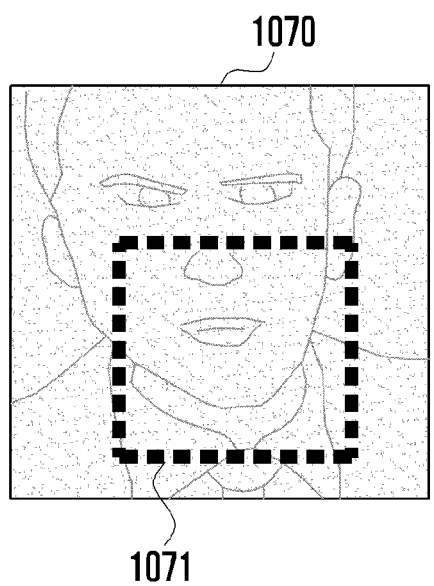
Figure 10C:
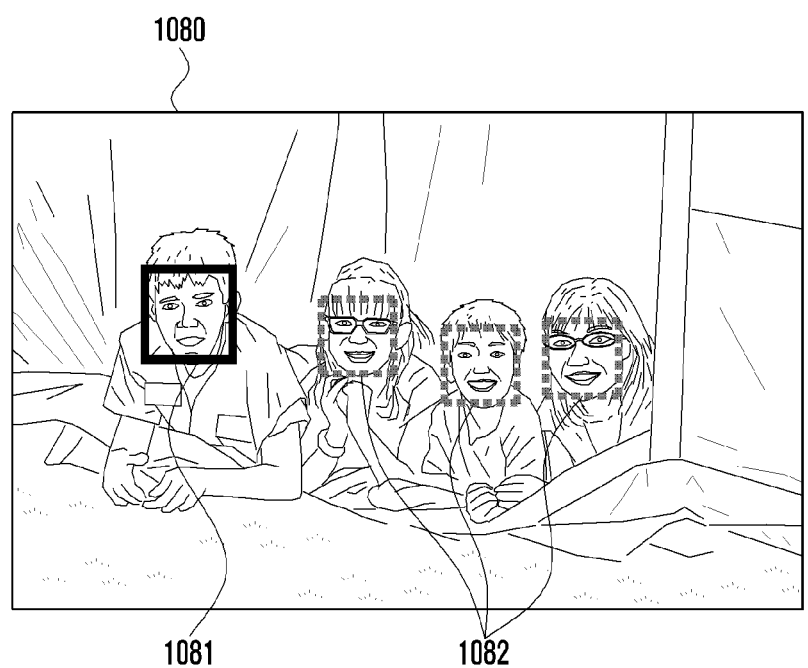

FIG. 10A to 10C schematically illustrate a method of providing a user interface for a lip reading operation of an electronic device according to various embodiments of the disclosure.

According to various embodiments, referring to FIG. 10A, the electronic device 101 may perform lip reading if noise around the electronic device is higher than or equal to a predetermined level or voices of people are simultaneously input. The electronic device 101 may recognize what a user speech, received through a lip recognizer module and an automatic speech recognition module, is about. For example, the electronic device 101 may detect movement of lips included in image information as indicated by reference numerals 1010 to 1060 and recognize a user speech on the basis thereof.

According to various embodiments, referring to FIG. 10B, if image information for performing lip reading has preset brightness or lower, the accuracy of lip reading is low, so that the electronic device 101 may make a request for the user to move a brighter place. For example, if an image 1070 of the user is acquired in a dark place, a mark 1071 may be displayed around the user's lips. For example, the mark 1071 may be indicated by a solid line if the lip reading is normally performed and may be indicated by dotted lines if it is difficult to perform the lip reading. In another example, the mark 1071 may be expressed with a green color if the lip reading is normally performed and may be expressed with a red color if it is difficult to perform the lip reading.

According to various embodiments, referring to FIG. 10C, the electronic device 101 may detect a plurality of lips in the image information 1080. The electronic device 101 may determine which lip is currently inputting a voice command among the detected lips. For example, the electronic device 101 may compare movement of the shape of the user's lips with the input voice and determine the lips actually inputting the voice command among the plurality of lips on the basis thereof.

According to various embodiments, referring to FIG. 10A, the electronic device 101 may display the lips such that lips 1081 currently inputting a voice command are distinguished from other lips 1082 in the image information 1080. For example, the lips 1081 currently inputting the voice command may be displayed with a thick solid line, and the other lips 1082 may be displayed with light dotted lines.

According to various embodiments, the electronic device 101 may control weighted values of voice recognition and lip reading according to a state of the received image information. For example, if brightness of the received image is equal to or lower than preset brightness, it may be determined that the accuracy of lip reading is low. Accordingly, if the user command is analyzed through a combination of voice recognition and lip reading, a high weighted value may be allocated to the result acquired through the voice recognition and a relatively low weighted value may be allocated to the result acquired through lip reading.

According to various embodiments, if the received voice information does not correspond to the user who is actually inputting the voice command, the electronic device 101 may control the weighted values of the voice recognition and the lip reading. For example, if a voice of the user actually inputting the voice command and voices of other people are simultaneously received, it may be determined that the accuracy of the voice recognition is low. Accordingly, if the user command is analyzed through a combination of voice recognition and lip reading, a low weighted value may be allocated to the result acquired through the voice recognition and a relatively high weighted value may be allocated to the result acquired through lip reading.

Figure 11:
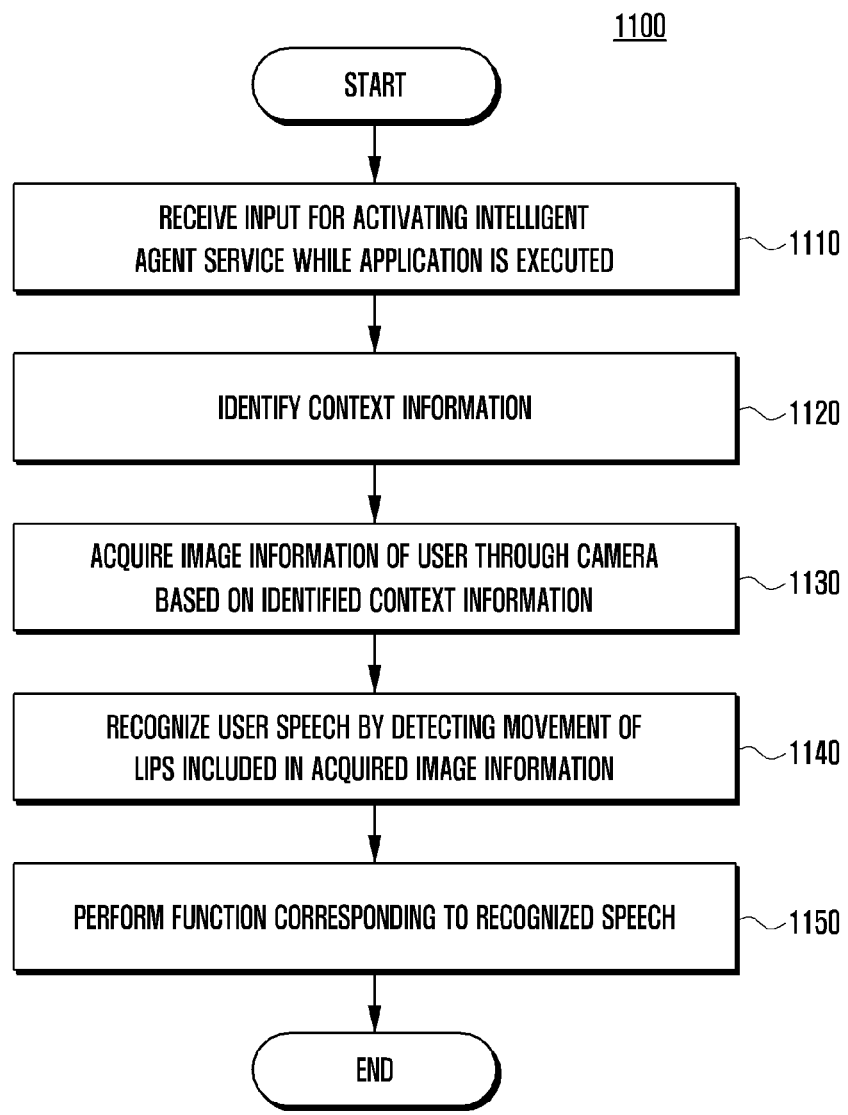
FIG. 11 is a flowchart illustrating a method of detecting movement of a lip, recognizing a user speech, and performing a function corresponding to the recognized speech while an application is executed according to various embodiments of the disclosure.

FIG. 11 is a flowchart illustrating a method 1100 of detecting movement of lips to recognize a user speech and performing a function corresponding to the recognized speech while an application is executed according to various embodiments of the disclosure.

According to various embodiments, the electronic device 101 may receive an input for activating an intelligent agent service while an application is executed in operation 1110.

According to various embodiments, the electronic device 101 may identify context information of the electronic device 101 in operation 1120.

According to various embodiments, the electronic device 101 may acquire information on an image of the user through a camera on the basis of the identified context information in operation 1130.

According to various embodiments, the electronic device 101 may detect movement of lips included in the acquired image information and recognize a user speech in operation 1140.

According to various embodiments, the electronic device 101 may perform a function corresponding to the recognized speech in operation 1150.

An electronic device according to various embodiments may include a camera, a microphone, a display, a memory, and a processor, wherein the processor is configured to receive an input for activating an intelligent agent service from a user while at least one application is executed, identify context information of the electronic device, control to acquire image information of the user through the camera, based on the identified context information, detect movement of a user's lips included in the acquired image information to recognize a speech of the user, and perform a function corresponding to the recognized speech.

The processor may be configured to acquire noise around the electronic device through the microphone and store information on the acquired noise around the electronic device as the context information.

The processor may be configured to activate the camera if the noise around the electronic device is higher than or equal to a preset value.

The processor may be configured to store at least one of a type or an execution state of the at least one application being executed as the context information and activate the camera if the at least one application being executed is reproducing music or a video.

The processor may be configured to control to receive a voice signal through the microphone, recognize a combination speech corresponding to a combination of the voice signal and the movement of the lips, and perform a function corresponding to the recognized combination speech.

The processor may be configured to, if brightness of the acquired image information is lower than a preset value, recognize a voice recognition-based speech corresponding to the voice signal except for the movement of the lips and perform a function corresponding to the recognized voice recognition-based speech.

The processor may be configured to, if brightness of the acquired image information is lower than a preset value, display a user interface indicating failure of recognition of the movement of the lips to the user through the display.

The processor may be configured to, if a plurality of lips are detected based on the acquired image information, identify the voice signal and movements of the plurality of lips and display a user interface for distinguishing lips corresponding to the user from other lips through the display.

The processor may be configured to set a weighted value of a first speech recognized based on movement of the lip corresponding to the user to be higher than a weighted value of a second speech recognized based on the voice signal acquired through the microphone and recognize the combination speech.

The processor may be configured to, even when the intelligent agent service is activated, seamlessly provide at least one piece of information on the at least one application.

A method by an electronic device according to various embodiments may include an operation of receiving an input for activating an intelligent agent service from a user while at least one application is executed, an operation of identifying context information of the electronic device, an operation of acquiring image information of the user through the camera, based on the identified context information, an operation of detecting movement of a user's lips included in the acquired image information to recognize a speech of the user, and an operation of performing a function corresponding to the recognized speech.

The method may further include an operation of acquiring around the electronic device through the microphone and an operation of storing information on the acquired noise around the electronic device as the context information.

The method may further include an operation of, if the noise around the electronic device is higher than or equal to a preset value, activating the camera.

The method may further include an operation of storing at least one of a type or an execution state of the at least one application being executed as the context information and an operation of activating the camera if the at least one application being executed is reproducing music or a video.

The method may further include an operation of receiving a voice signal through the microphone, an operation of recognizing a combination speech corresponding to a combination of the voice signal and the movement of the lips, and an operation of performing a function corresponding to the recognized combination speech.

The method may further include an operation of, if brightness of the acquired image information is equal to or lower than a preset value, recognizing a voice recognition-based speech corresponding to the voice signal except for the movement of the lips and an operation of performing a function corresponding to the recognized voice recognition-based speech.

The method may further include an operation of, if brightness of the acquired image information is lower than a preset value, displaying a user interface indicating failure of recognition of the movement of the lips to the user through the display.

The method may further include an operation of, if a plurality of lips are detected based on the acquired image information, identifying the voice signal and movements of the plurality of lips and an operation of displaying a user interface for distinguishing lips corresponding to the user from other lips through the display.

The method may further include an operation of configuring a weighted value of a first speech recognized based on movement of the lip corresponding to the user to be higher than a weighted value of a second speech recognized based on the voice signal acquired through the microphone and recognizing the combination speech.

The method may further include an operation of, even when the intelligent agent service is activated, seamlessly providing at least one piece of information on the at least one application.

Although the present disclosure has been described with various embodiments, various changes and modifications may be suggested to one skilled in the art. It is intended that the present disclosure encompass such changes and modifications as fall within the scope of the appended claims

What is claimed is:

1. An electronic device comprising:
a camera;
a microphone;
a display;
a memory; and
a processor configured to:
receive an input for activating an intelligent agent service from a user while at least one application is executed,
identify context information of the electronic device,
control to acquire image information of the user through the camera based on the identified context information including information on the executed at least one application,
determine an accuracy associated with the acquired image information based on the context information,
display an indicator configured to indicate the determined accuracy, obtain a first speech recognition result based on identifying movement of a user's lips included in the acquired image information, wherein the first speech recognition result is weighted based on the determined accuracy associated with the acquired image information, control to receive a voice signal through the microphone, determine an accuracy associated with the received voice signal based on the context information, obtain a second speech recognition result based on analyzing the voice signal, wherein the second speech recognition result is weighted based on the determined accuracy associated with the voice signal, generate a combination speech recognition result based on the first speech recognition result and the second speech recognition result, perform a function of the executed at least one application corresponding to the generated combination speech, recognition result, and display, based on determining that the movement of the user's lips is not identified, the indicator comprising a guide for the user to adjust an orientation of the electronic device, wherein the processor is further configured to blurredly display or flicker an icon indicating that user's lips is not identified.

2. The electronic device of claim 1, wherein the processor is configured to:

acquire noise around the electronic device through the microphone; and store information on the acquired noise around the electronic device as the context information.

3. The electronic device of claim 2, wherein the processor is configured to activate the camera based on the noise around the electronic device being higher than or equal to a preset value.

4. The electronic device of claim 1, wherein the processor is configured to:

store at least one of a type or an execution state of the at least one application being executed as the context information; and activate the camera based on the at least one application being executed reproducing music or a video.

5. The electronic device of claim 1, wherein the processor is configured to, based on brightness of the acquired image information being equal to or lower than a preset value:

recognize a voice recognition-based speech corresponding to the voice signal except for the movement of the user's lips; and perform a function of the at least one executed application corresponding to the recognized voice recognition-based speech.

6. The electronic device of claim 1, wherein the processor is configured to, based on brightness of the acquired image information being lower than a preset value, display a user interface indicating failure of recognition of the movement of the user's lips to the user through the display.

7. The electronic device of claim 1, wherein the processor is configured to, based on a plurality of lips being detected based on the acquired image information:

identify the voice signal and movements of the plurality of lips; and display a user interface for distinguishing lips corresponding to the user from other lips through the display.

8. The electronic device of claim 1, wherein the processor is configured to, based on the intelligent agent service being activated, provide at least one piece of information on the at least one application.

9. A method by an electronic device, the method comprising:

receiving an input for activating an intelligent agent service from a user while at least one application is executed;

identifying context information of the electronic device;

acquiring image information of the user through a camera based on the identified context information including information on the executed at least one application;

determining an accuracy associated with the acquired image information based on the context information;

displaying an indicator configured to indicate the determined accuracy;

obtaining a first speech recognition result based on identifying movement of a user's lips included in the acquired image information, wherein the first speech recognition result is weighted based on the determined accuracy associated with the acquired image information;

receiving a voice signal through a microphone;

determining an accuracy associated with the received voice signal based on the context information, obtaining a second speech recognition result based on analyzing the voice signal, wherein the second speech recognition result is weighted based on the determined accuracy associated with the voice signal;

generating a combination speech recognition result based on the first speech recognition result and the second speech recognition result;

performing a function of the executed at least one application corresponding to the generated combination speech recognition result; and when the movement of the user's lips is not identified, displaying the indicator to provide a guide for adjusting an orientation of the electronic device to user, and blurredly display or flicker an icon indicating that user's lips is not identified.

10. The method of claim 9, further comprising:

acquiring noise around the electronic device through a microphone; and storing information on the acquired noise around the electronic device as the context information.

11. The method of claim 10, further comprising, based on the noise around the electronic device being higher than or equal to a preset value, activating the camera.

12. The method of claim 9, further comprising:

storing at least one of a type or an execution state of the at least one application being executed as the context information; and activating the camera based on the at least one application being executed reproducing music or a video.

13. The method of claim 9, further comprising:

based on brightness of the acquired image information being equal to or lower than a preset value, recognizing a voice recognition-based speech corresponding to the voice signal except for the movement of the user's lips; and performing a function corresponding to the recognized voice recognition-based speech.

14. The method of claim 9, further comprising, based on brightness of the acquired image information being lower than a preset value, displaying a user interface indicating failure of recognition of the movement of the user's lips to the user through the display.

15. The method of claim 9, further comprising:
based on a plurality of lips being detected based on the acquired image information, identifying the voice signal and movements of the plurality of lips; and
displaying a user interface for distinguishing lips corresponding to the user from other lips through the display.

16. The method of claim 9, further comprising, based on the intelligent agent service being activated, providing at least one piece of information on the at least one application.

* * * * *